(12) United States Patent
Raoult

(10) Patent No.: US 7,021,678 B1
(45) Date of Patent: Apr. 4, 2006

(54) FOUR POSITION GATE LATCH ASSEMBLY

(76) Inventor: Philippe P. Raoult, 665 Necterine St., Oxnard, CA (US) 93030

( * ) Notice: Subject to any disclaimer, the term of this patent is extended or adjusted under 35 U.S.C. 154(b) by 143 days.

(21) Appl. No.: 10/681,664

(22) Filed: Oct. 7, 2003

(51) Int. Cl.
E05C 5/00 (2006.01)

(52) U.S. Cl. .............. 292/63; 292/64; 292/66; 292/67; 292/145; 292/146; 292/292; 292/341.15; 292/DIG. 29; 292/DIG. 63; 256/1; 256/73

(58) Field of Classification Search ........... 292/63, 292/64, 66, 67, 137, 138, 145, 148, 150, 292/302, 292, 295, DIG. 29, 202, 210, 238, 292/341.15, DIG. 63; 256/1, 73
See application file for complete search history.

(56) References Cited

U.S. PATENT DOCUMENTS

| 394,685 | A | * | 12/1888 | Fether ................ 292/210 |
| 777,135 | A | * | 12/1904 | Parsons ................ 292/57 |
| 817,521 | A | * | 4/1906 | Saunders ................ 292/4 |
| 823,543 | A | * | 6/1906 | Packer ................ 292/4 |
| 880,265 | A | * | 2/1908 | Anderson ................ 292/4 |
| 912,631 | A | * | 2/1909 | Thompson ................ 292/4 |
| 922,899 | A | * | 5/1909 | Hissong ................ 292/4 |
| 1,060,238 | A | * | 4/1913 | Elston ................ 292/4 |
| 1,326,554 | A | * | 12/1919 | Watson ................ 292/236 |
| 1,658,762 | A | * | 2/1928 | Dickerson ................ 292/5 |
| 2,631,877 | A | * | 3/1953 | Ainsworth ................ 292/57 |
| 2,794,663 | A | * | 6/1957 | Grodt et al. ................ 292/67 |
| 3,158,908 | A | * | 12/1964 | Springer ................ 49/465 |
| 3,433,518 | A | * | 3/1969 | Foltz ................ 292/238 |
| 3,907,344 | A | * | 9/1975 | Newlon et al. ................ 292/66 |
| 3,938,836 | A | * | 2/1976 | Smith ................ 292/148 |
| 3,953,064 | A | * | 4/1976 | McHenry ................ 292/184 |
| 4,062,575 | A | * | 12/1977 | Robins ................ 292/67 |
| 4,305,611 | A | * | 12/1981 | Robins ................ 292/238 |
| 4,307,904 | A | * | 12/1981 | Daus ................ 292/148 |
| 4,437,692 | A | * | 3/1984 | Halopoff ................ 292/57 |
| 4,513,593 | A | * | 4/1985 | Wilson ................ 70/114 |
| 4,592,578 | A | * | 6/1986 | Martin ................ 292/40 |
| 4,613,175 | A | * | 9/1986 | Nelson ................ 292/148 |
| 4,643,469 | A | * | 2/1987 | Johnston et al. ................ 292/66 |
| 4,655,487 | A | * | 4/1987 | Korn et al. ................ 292/57 |
| 4,690,440 | A | * | 9/1987 | Rogers ................ 292/54 |

(Continued)

FOREIGN PATENT DOCUMENTS

GB 412000 * 6/1934

Primary Examiner—Brian E. Glessner
Assistant Examiner—Carlos Lugo
(74) Attorney, Agent, or Firm—Albert O. Cota

(57) ABSTRACT

A four position gate latch (20) that is used to fasten and lock a gate. The gate latch includes a self fastening gravity gate latch (22) that is fastened to one face of the gate. A gate latch bracket (28) is fastened to the gate on an opposed face, mating with said gate latch. A latch striker bar slideably extends from the bracket such that the striker bar interfaces with the gate latch and links the gate portions together. A locking bolt (60) slideably extends though the bracket, allowing it to interface with the gate latch and provide positive locking capabilities. The gate latch is capable of being placed in a self fastening gravity gate latch conventional position, a locked position with the locking bolt penetrating a padlock hole, an unlatched position that permits the gate to swing inward on the gate latch side without interference, and a free-swinging position that permits the gate to pivot in both directions.

15 Claims, 5 Drawing Sheets

U.S. PATENT DOCUMENTS

| | | | |
|---|---|---|---|
| 4,911,486 A * | 3/1990 | Anderson | 292/148 |
| 4,938,508 A * | 7/1990 | Thomas | 292/235 |
| 4,977,763 A * | 12/1990 | Sewell | 70/54 |
| 4,986,576 A * | 1/1991 | Anderson | 292/40 |
| 4,993,759 A * | 2/1991 | Thomas | 292/235 |
| 5,114,193 A * | 5/1992 | Nass | 292/67 |
| 5,125,695 A * | 6/1992 | Hartwell | 292/62 |
| 5,358,292 A * | 10/1994 | Van Wiebe et al. | 292/235 |
| 5,427,422 A * | 6/1995 | Madlener et al. | 292/264 |
| 5,452,544 A * | 9/1995 | Weathington, Sr | 49/394 |
| 5,474,341 A * | 12/1995 | Putman et al. | 292/230 |
| 5,511,835 A * | 4/1996 | Hardee | 292/238 |
| 5,599,050 A * | 2/1997 | Tinsley | 292/230 |
| 5,622,395 A * | 4/1997 | Shine et al. | 292/125 |
| 5,655,801 A * | 8/1997 | Casey | 292/210 |
| 5,782,507 A * | 7/1998 | Hardee | 292/267 |
| 5,799,990 A * | 9/1998 | Hardee | 292/238 |
| 5,868,446 A * | 2/1999 | Rossmo | 292/341.17 |
| 6,058,747 A * | 5/2000 | Doyle et al. | 70/137 |
| 6,176,043 B1 * | 1/2001 | Gibbs | 49/501 |
| 6,347,819 B1 * | 2/2002 | Plaxco | 292/336 |
| 6,449,994 B1 * | 9/2002 | Kreyenborg | 70/101 |
| 6,550,838 B1 * | 4/2003 | Bobbitt et al. | 296/52 |
| 6,679,530 B1 * | 1/2004 | Krynski | 292/210 |
| 6,752,438 B1 * | 6/2004 | DeSouza | 292/238 |
| 6,772,613 B1 * | 8/2004 | Webb et al. | 70/159 |

* cited by examiner

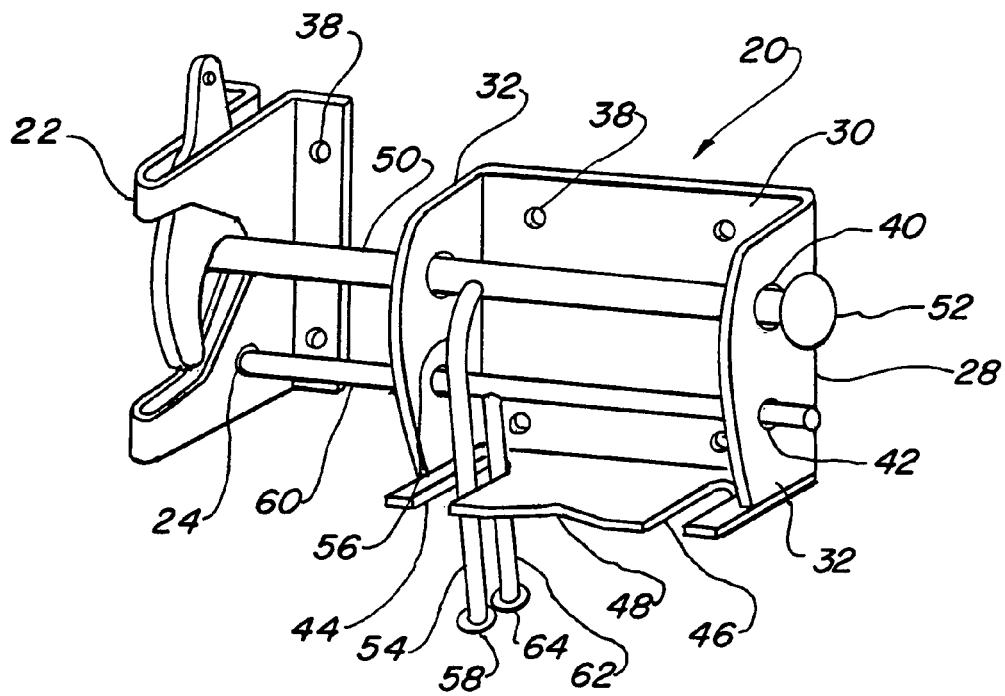
FIG. 2
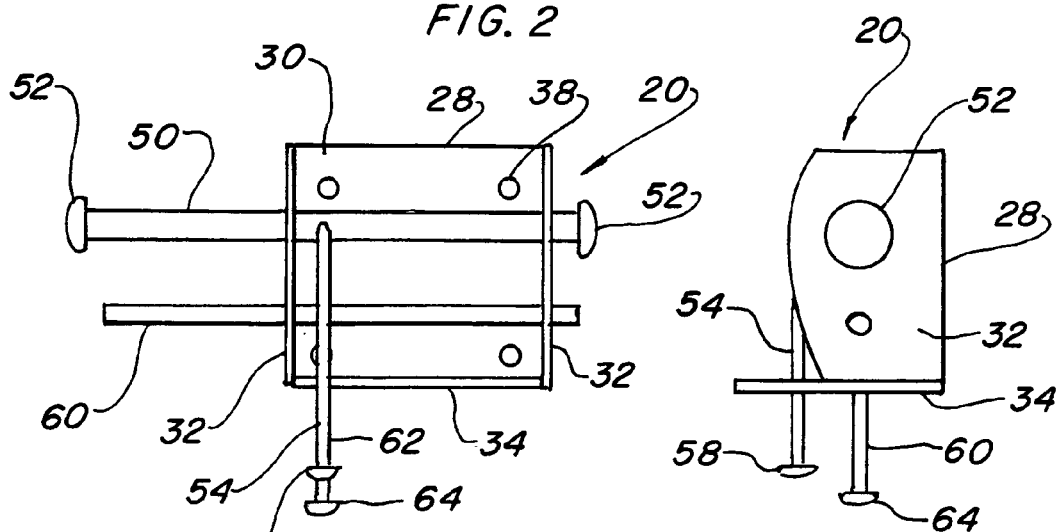
FIG. 3
FIG. 4
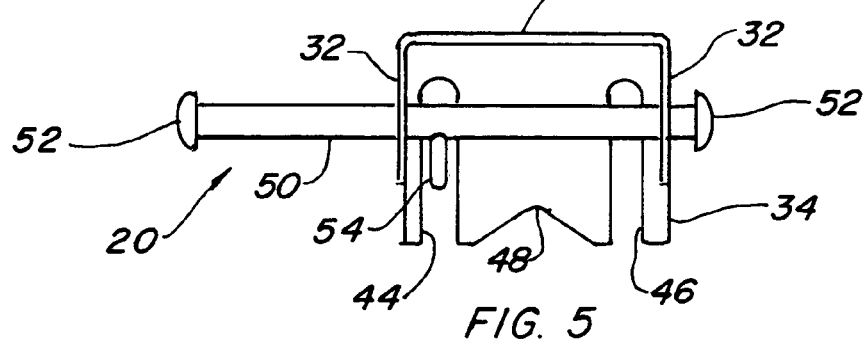
FIG. 5

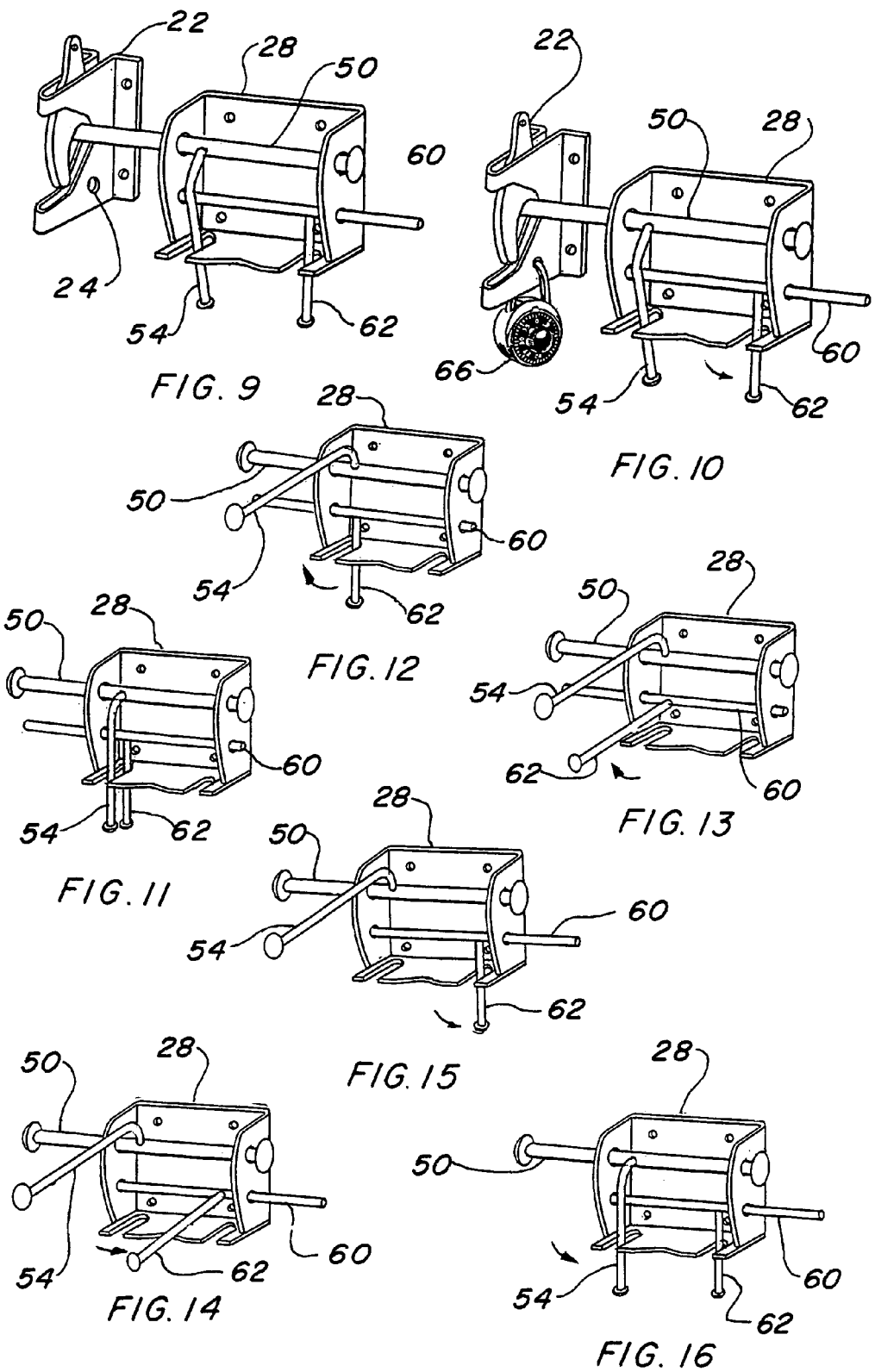

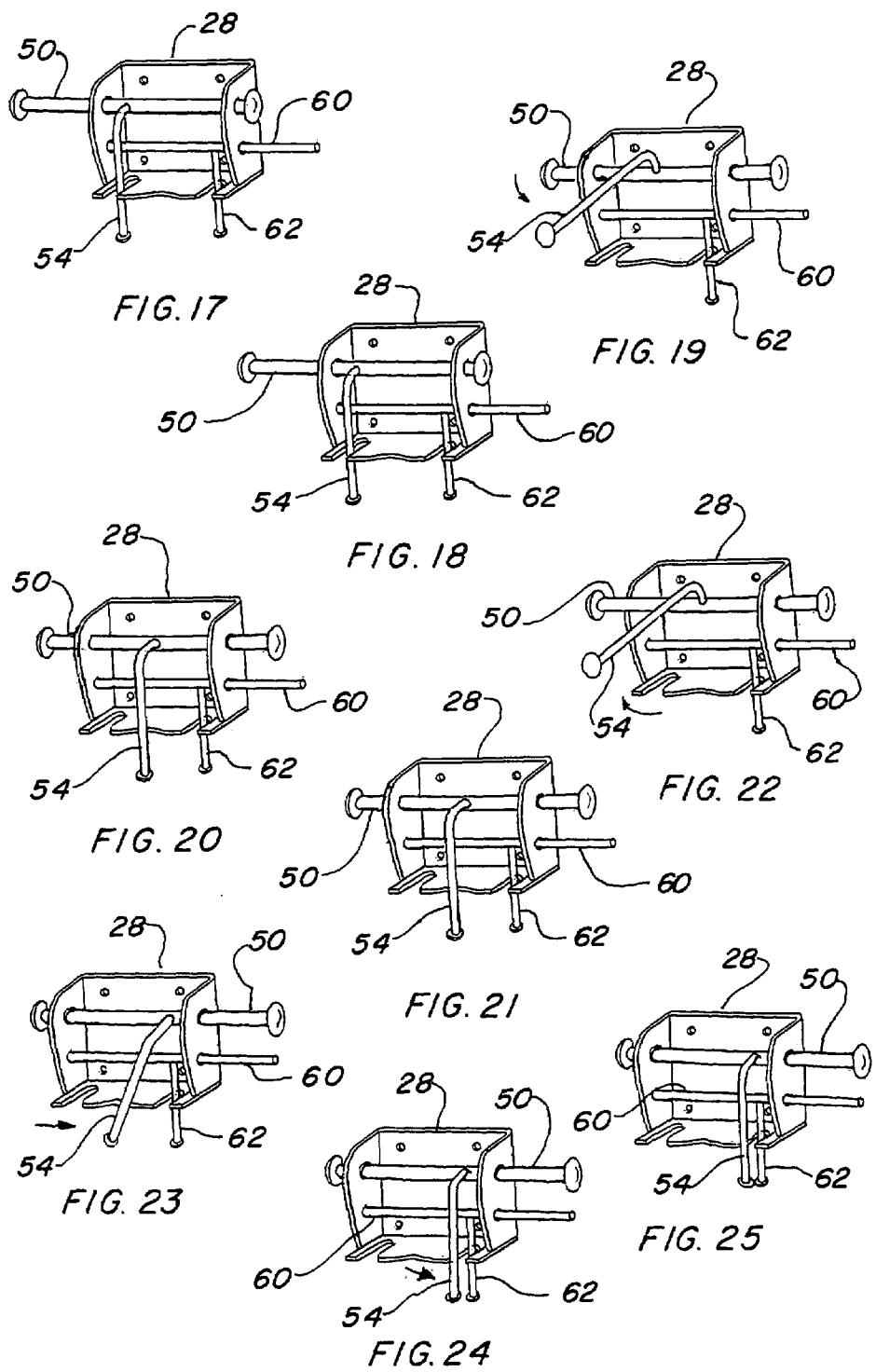

FOUR POSITION GATE LATCH ASSEMBLY

TECHNICAL FIELD

The invention relates to gate latches in general, and more specifically to a gate latch utilizing a self-fastening gravity gate latch in combination with a bracket having a striker bar and a locking bolt, which permits operation in four separate positions.

BACKGROUND ART

Previously, many types of gate latches have been used to provide an effective means of securing gates, specifically wooden fence gates and the like. In most cases, the latches are rather elaborate and require many individual components, thus making them expensive and complex.

A search of the prior art did not disclose any patents that possess the novelty of the instant invention, however the following U.S. patents are considered related:

| Patent Number | Inventor | Issue Date |
| --- | --- | --- |
| 3,953,064 | Mc Henry | Apr. 27, 1976 |
| 4,643,469 | Johnston et al. | Feb. 17, 1987 |
| 4,690,440 | Rogers | Sep. 1, 1987 |
| 5,452,544 | Weathington, Sr. | Sep. 26, 1995 |

Mc Henry in U.S. Pat. No. 3,953,064 teaches a gate latch suitable for sliding and swinging doors. The invention includes a vertically sliding, self-engaging bolt and a manually-positioned bolt blocking member. The latch is particularly applicable for installation in doors of animal pens.

U.S. Pat. No. 4,643,469 issued to Johnston et al. is for a latch used with a gate that includes a latch body with a planar surface and a pair of flanges which receive a bolt. The bolt is parallel to the gate surface and is disposed within the flange openings. An enlargement on one side of the bolt allows the bolt to pass though one of the flanges when properly positioned.

Rogers in U.S. Pat. No. 4,690,440 discloses a gate latch structure with a striker bar mounted on a fence gate with an integral gate handle. A pivotal latch member is mounted on a back plate on a fence post or the like. The striker bar has a rear edge recessed from the rear of the striker bar opening which permits the back plate to absorb the impact when the gate is closed.

Weathington, Sr. in U.S. Pat. No. 5,452,544 teaches a tamper-resistant gate latching mechanism with a latch bar extending from a housing to the free end of a gate. The invention utilizes a catch member mounted onto a gate post and engages the latch bar such that the fasteners are covered, thus preventing tampering.

DISCLOSURE OF THE INVENTION

Latches for interior and exterior gates, and particularly gates on fences, have been utilized for centuries in one form or another. At the present time a gravity type gate latch that is self-fastening is exceptionally popular and used on a great number of gates throughout the United States. A conventional gate latch utilizes a pivoting cam latch that is enclosed within a stamped and formed sheet metal housing and is usually fastened with screws to a stationary portion of the fence. The gate latch is sturdy and robust and will last for a considerable duration as it utilizes a heavy metal structure and is normally plated to resist corrosion. Therefore, the primary object of the invention is to expand the use of this existing gate latch design without affecting its original function by using a different striker bar that is movable to produce additional capabilities. The invention may be used in four different ways that expand the functional operation of an industry standard latch. First, the gate latch retains its conventional operation which allows the gate to be opened from the outside by pulling on a cord, cable or chain that pivots a cam latch away from the striker bar. Second, the invention permits a locked position, with a locking bolt penetrating an existing padlock hole in the gate latch. Third, an unlatched position permits the gate to swing inward on the gate latch side without interference. Fourth, a free-swinging position permits the gate to pivot in both directions.

An important object of the invention is that the most difficult manufacturing element is the gravity gate latch which is already in production in vast numbers, therefore using economies of numbers the initial cost can be maintained at a low level.

Another object of the invention is that the gate latch and bracket are extremely simple to produce with standard production equipment.

Still another object of the invention is the ease of operation, as one simply extends the locking bolt into the hole in the gate latch to lock the latch. Additionally, the position of the latch striker bar is easily understood when visually observed.

Yet another object of the invention is the ease of installation as both the gate latch and the latch bracket are easily mounted with four screws in a conventional manner.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 2 is a partial isometric view of the gate latch in its preferred embodiment in the locked position.

FIG. 3 is a front elevation view of the gate latch.

FIG. 4 is a right side view of the gate latch.

FIG. 5 is a top plan view of the gate latch,

FIG. 9 is a partial isometric view of the locking bolt gate latch in the conventional locked position.

FIG. 10 is a partial isometric view of the locking bolt gate latch in the conventional locked position with a padlock added onto the self-fastening gravity gate latch.

FIG. 11 is a partial isometric view of the locking bolt gate latch in the completed locked position.

FIG. 12 is a partial isometric view of the locking bolt gate latch shown in the first step in unlocking the latch from its locked position.

FIG. 13 is a partial isometric view of the locking bolt gate latch shown in the second step in unlocking the latch from its locked position.

FIG. 14 is a partial isometric view of the locking bolt gate latch shown in the third step in unlocking the latch from its locked position.

FIG. 15 is a partial isometric view of the locking bolt gate latch shown in the fourth step in unlocking the latch from its locked position.

FIG. 16 is a partial isometric view of the locking bolt gate latch shown in the fifth step in unlocking the latch from its locked position.

FIG. 17 is a partial isometric view of the locking bolt gate latch shown in its unlocked position.

FIG. 18 is a partial isometric view of the locking bolt gate latch shown in its unlocked position.

FIG. 19 is a partial isometric view of the locking bolt gate latch shown in the first step to accomplish the latch from the unlocked to the unlatched position.

FIG. 20 is a partial isometric view of the locking bolt gate latch shown in its unlatched position.

FIG. 21 is a partial isometric view of the locking bolt gate latch shown in its unlatched position starting towards a free swinging position.

FIG. 22 is a partial isometric view of the locking bolt gate latch shown in the first step to accomplish the free swinging position.

FIG. 23 is a partial isometric view of the locking bolt gate latch shown in the second step to accomplish the free swinging position.

FIG. 24 is a partial isometric view of the locking bolt gate latch shown in the third step to accomplish the free swinging position.

FIG. 25 is a partial isometric view of the locking bolt gate latch shown in the free swinging position.

BEST MODE FOR CARRYING OUT THE INVENTION

Figure 1:
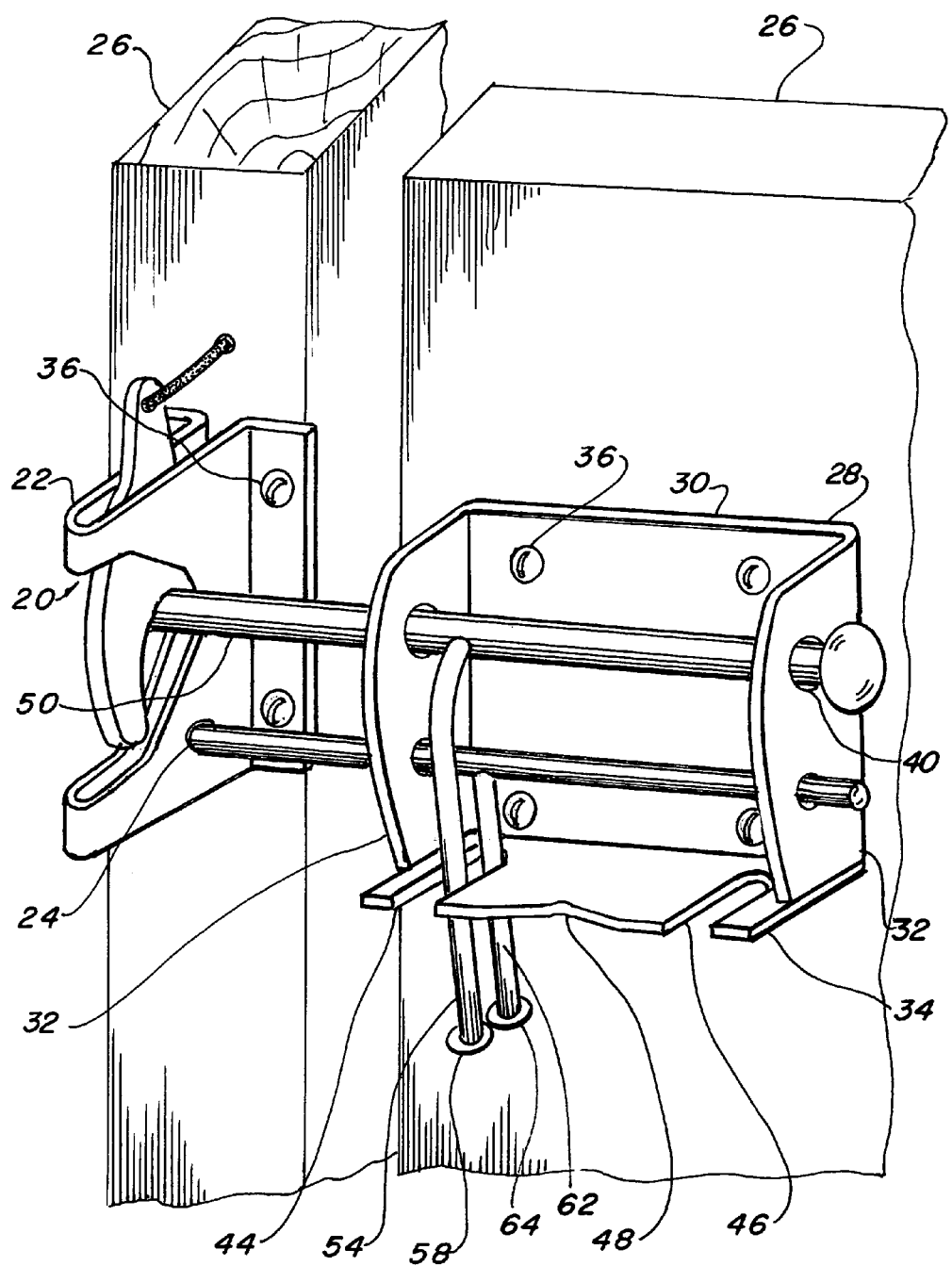
FIG. 1 is a partial isometric view of the preferred embodiment attached to a wooden fence post and gate.
Figure 6:
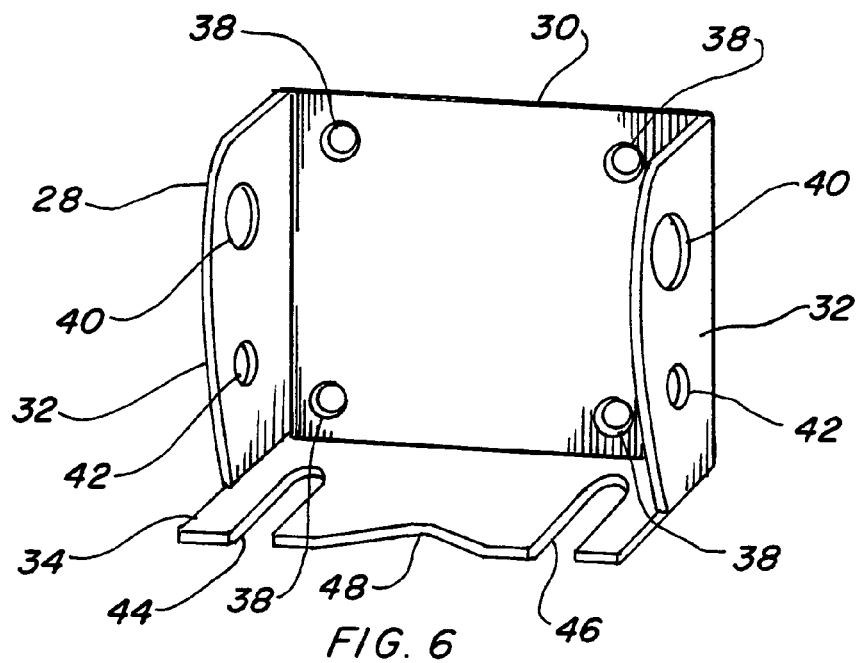
FIG. 6 is a partial isometric view of the gate latch bracket completely removed from the invention for clarity.
Figure 7:
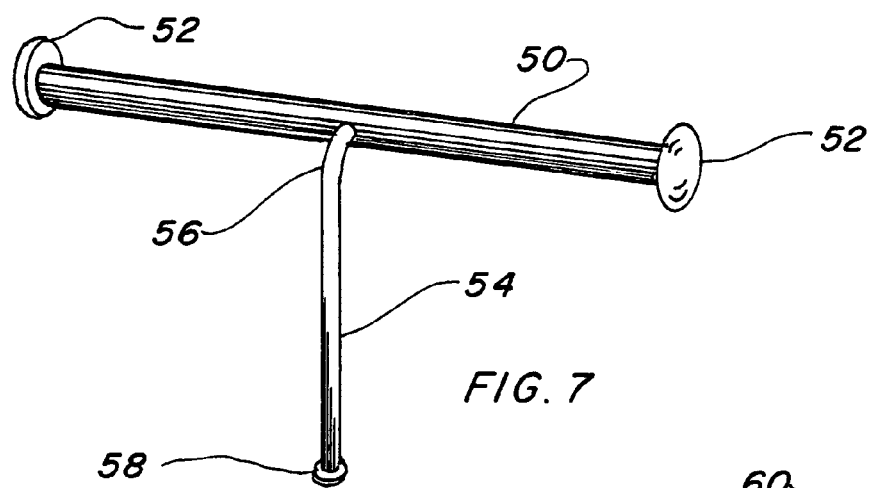
FIG. 7 is a partial isometric view of the latch striker bar completely removed from the invention for clarity.
Figure 8:
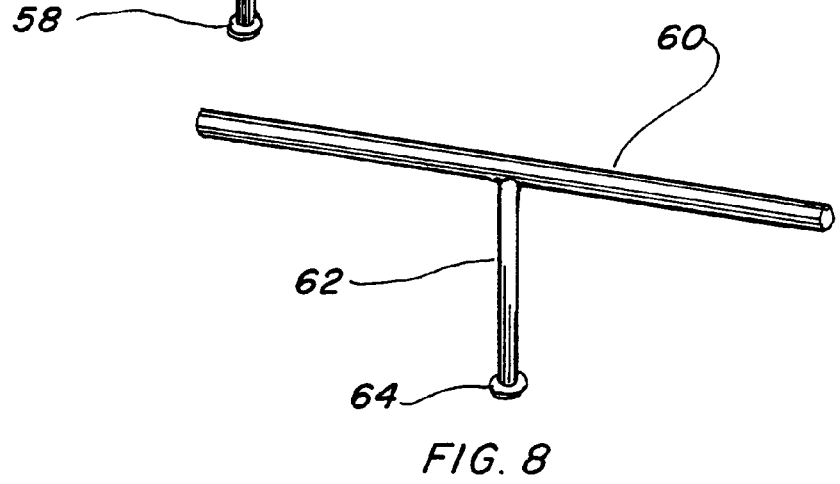
FIG. 8 is a partial isometric view of the locking bolt gate latch completely removed from the invention for clarity.

The best mode for carrying out the invention is presented in terms of a preferred embodiment. The preferred embodiment as shown in FIGS. 1 through 25, is comprised of a four position gate latch 20, which is preferably made of metal and incorporates a self fastening gravity gate latch 22 having a padlock hole 24 therethrough. The padlock hole 24 is commonly included in some models of the latch 20 or the latch may be modified by adding the hole after assembly. The gate latch 22 is fastened to one face of a gate 26, as shown in FIG. 1, and consists of a pivoting cam latch enveloped within a flanged housing.

A gate latch bracket 28 is attached to the gate 26, preferably on the pivoting side in parallel alignment with the gate latch 22. The gate latch bracket 28 is formed from sheet metal and is configured to include a base 30 with a pair of opposed outward-extending vertical flanges 32 and an outward-extending bottom flange 34. The bracket 28 is fastened to the gate 26 with screws 36 attached through mounting holes 38.

Each vertical flange 32 has a striker bar hole 40 and a locking bolt hole 42 in horizontal parallel alignment with each other. The vertical flanges 32 contiguously engage the bottom flange 34 for augmenting the structural integrity of the bracket 28.

The bottom flange 34 further has a locked slot 44 on a first side, and an unlocked slot 46 on a second opposed side, with an intermediate notched indentation 48 therebetween, as illustrated in FIGS. 1–3, 5 and 6. The gate latch bracket's bottom flange locked slot 44 and unlocked slot 46 extend inward such that the slots are vertically in line with the striker bar holes 40. The gate latch bracket's bottom flange notched indentation 48 is adjacent to the outer edge of the bottom flange 34.

A latch striker bar 50 slideably extends though the pair of striker bar holes 40 in the bracket flanges 32 such that the striker bar 50 interfaces with the gate latch 22 and links portions of the gate 26 together. The latch striker bar 50 is preferably made of metal and has a diameter appropriately sized to interface with the self fastening gravity gate latch 22. A head 52 is formed on each distal end of the latch striker bar 50 by forming the ends into a radial shape by compression. Other types of heads 52 may be used with equal ease and many variations of heads, knobs or grips are well known in the art. A striker bar handle 54 is attached onto the latch striker bar 50 and is configured with an offset 56 in the handle 54 that is sufficiently contoured to clear obstructions, with a head 58 preferably formed or added to the distal end of the handle 54.

A locking bolt 60 slideably extends though the pair of locking bolt holes 42 and interfaces with said gate latch 22 in its padlock hole 24. The locking bolt 60 has a diameter sized to penetrate the padlock hole 24 in the self fastening gravity gate latch 22 and includes a bolt handle 62 with a bolt handle head 64 on the distal end. The purpose of the bolt handle 62 is for relocating the locking bolt 60 into various positions as required to accomplish the invention's purpose.

The gate latch 20 is capable of being placed in four separate positions as follows: First, a self fastening gravity gate latch conventional position; second, a locked position with the locking bolt penetrating the padlock hole; third, an unlatched position that permits the gate to swing inward on the gate latch side without interference; and fourth, a free-swinging position that permits the gate to pivot in both directions.

The drawings depict the operation of the invention in these four positions with FIG. 9 showing the locking bolt gate latch 20 in the first, conventional locked position, and with FIG. 10 adding a conventional padlock 66 onto the gate latch 22 as an option. FIG. 11 illustrates the gate latch 20 in the second, locked position with both handles 54 and 62 in the locked slot 44. FIG. 12 depicts the first step in unlocking the assembly from the second locked position. FIG. 13 depicts the second step, FIG. 14 depicts the third step. FIG. 15 depicts the fourth step, FIG. 16 depicts the fifth and finally, FIG. 17 depicts the locking bolt gate latch 20 in its unlocked position.

FIG. 18 depicts the locking bolt gate latch 20 in its unlocked position, with FIG. 19 showing the first step to accomplish the third unlatched position. FIG. 20 illustrates the completed unlatched position with both handles 54 and 62 in the intermediate position 48.

FIG. 21 shows the unlatched position before starting towards the fourth free-swinging position. FIG. 22 shows the first step to accomplish the free-swinging position. FIG. 23 shows the second step, FIG. 24 shows the third step, and FIG. 25 shows the locking bolt gate latch 20 in the free-swinging position, with both handles 54 and 62 in the unlocked slot 46.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. A four position gate latch assembly for use with a gate comprising:
   a) a self fastening gravity gate latch having a padlock hole therethrough, said gate latch for fastening to one face of said gate,
   b) a gate latch bracket having a pair of opposed outward-extending vertical flanges and an outward-extending bottom flange for fastening to said gate on a separate face mating said gate latch,
   c) each vertical flange having a striker bar hole and a locking bolt hole, with each analogous hole in horizontal parallel alignment with the other,
   d) said bottom flange having a locked slot on a first side, an unlocked slot on a second opposed side and an intermediate notched indentation therebetween,
   e) a latch striker bar slideably extending though said pair of striker bar holes such that the striker bar interfaces with the gate latch and links the gate faces together, and
   f) a locking bolt slideably extending though said pair of locking bolt holes and interfacing with said gate latch in said padlock hole, wherein said gate latch being capable of being placed in a self fastening gravity gate latch conventional position, a locked position with the locking bolt penetrating said padlock hole, a unlatched position that permits the gate to swing inward on the gate latch side without interference, and a free-swinging position that permits the gate to pivot in both directions.

2. The four position gate latch assembly as recited in claim 1 wherein said self fastening gravity gate latch further comprises a pivoting cam latch enveloped within a flanged housing.

3. The four position gate latch assembly as recited in claim 1 wherein said gate latch bracket is formed from sheet metal.

4. The four position gate latch assembly as recited in claim 1 wherein said gate latch bracket having a plurality of mounting holes therethrough for attachment of the bracket to said gate.

5. The four position gate latch assembly as recited in claim 1 wherein said gate vertical flanges contiguously engage said bottom flange to augment the structural integrity of the bracket.

6. The four position gate latch assembly as recited in claim 1 wherein said gate latch bracket bottom flange's locked and unlocked slots extend inward such that the slots are vertically in-line with said striker bar.

7. The four position gate latch assembly as recited in claim 1 wherein said gate latch bracket bottom flange's notched indentation is adjacent to the flange's outer edge.

8. The four position gate latch assembly as recited in claim 1 wherein said latch striker bar further comprising a diameter appropriately sized to interface with the self fastening gravity gate latch.

9. The four position gate latch assembly as recited in claim 1 wherein said latch striker bar further comprises a head formed on each distal end.

10. The four position gate latch assembly as recited in claim 1 wherein said latch striker bar further comprises a striker bar handle attached thereunto and having an offset in said handle sufficient to clear said locking bolt when aligned vertically with said locking bolt.

11. The four position gate latch assembly as recited in claim 10 wherein said striker bar handle further comprises a head formed on a distal end.

12. The four position gate latch assembly as recited in claim 1 wherein said locking bolt further having a diameter sized to penetrate said padlock hole in the self fastening gravity gate latch.

13. The four position gate latch assembly as recited in claim 1 wherein said locking bolt further comprising a bolt handle for relocating the locking bolt into various positions.

14. The four position gate latch assembly as recited in claim 13 wherein said bolt handle further comprises a head formed on a distal end.

15. The four position gate latch assembly as recited in claim 1 wherein said four position gate latch is made of metal.

* * * * *